United States Patent Office 3,586,706
Patented June 22, 1971

3,586,706
ORGANOSILICON COMPOUNDS
Richard P. Bush, Llandough, Penarth, Glamorgan, and Christopher Arthur Pearce, Cowbridge, Glamorgan, Wales, assignors to Midland Silicones Limited, Reading, England
No Drawing. Filed Oct. 2, 1968, Ser. No. 764,588
Claims priority, application Great Britain, Oct. 5, 1967, 45,559/67
Int. Cl. C07f 7/10
U.S. Cl. 260—448.2N                                            6 Claims

ABSTRACT OF THE DISCLOSURE

Siloxane-silazane copolymers of the general formula, $[(R_3Si)_2NSiR'_2(OSiR''_2)_nO]_2SiR'''_2$ where the various R's are defined organic radicals and hydrogen atoms and $n$ is 0 or 1 are disclosed. These copolymers are prepared by reacting the corresponding silazane-siloxanol with certain amino-silicon compounds. The novel compounds are useful as anti-foaming agents.

This invention relates to organosilicon compounds containing both siloxane linkages and silazane linkages.

According to the invention, there are provided organosilicon compounds of the general formula $$[(R_3Si)_2NSiR'_2(OSiR''_2)_nO]_2SiR'''_2$$

wherein each R represents a hydrogen atom, an alkyl or alkenyl radical containing less than 6 carbon atoms or a monocyclic aryl radical, not more than two R groups attached to any one silicon atom being hydrogen atoms, each R' and each R''' represents an alkyl or alkenyl radical containing less than 6 carbon atoms or a monocyclic aryl radical, each R'' represents a monovalent hydrocarbon radical and $n$ has a value of 0 or 1.

In the general formula R, R' and R''' can be, for example, methyl, ethyl, propyl, vinyl, allyl, phenyl, p-tolyl, p-xylyl and nitrophenyl radicals. R can also represent a hydrogen atom except that not more than two R groups attached to any one silicon atom can be hydrogen.

The radicals represented by R'' can be any monovalent hydrocarbon radicals, for example, alkyl radicals such as methyl, ethyl and propyl radicals, alkenyl radicals such as vinyl and allyl radicals and aromatic hydrocarbon radicals such as phenyl, xenyl and tolyl radicals. Preferably, however, R, R', R'' and R''' are selected from lower alkyl radicals and are most preferably methyl or ethyl radicals.

The organosilicon compounds of this invention can be regarded as trisiloxanes ($n=0$) or pentasiloxanes ($n=1$) wherein each of the terminal silicon atoms has bonded thereto a bis(triorganosilyl)amino group. The compounds therefore contain terminal silazane linkages and are also characterized by the presence therein of two nitrogen atoms to each of which there are bonded three silicon atoms.

The compouds of this invention can be prepared by the reaction of (1) a compound of the general formula $$(R_3Si)_2NSiR'_2[OSiR''_2]_nOH$$

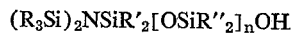

wherein R, R', R'' and $n$ are as hereinbefore defined with (2) an aminosilicon compound of the general formula (a) $R'''_2Si(NXY)_2$ or of the general formula (b)

$$(R'''_2SiNX)_p$$

wherein R''' is as hereinbefore defined; X is hydrogen, an alkyl radical or the phenyl radical, Y is an alkyl radical or a phenyl radical and $p$ has a value of 2, 3 or 4, X being an alkyl radical or a phenyl radical when $p$ is 2.

In the general formulae X and Y can represent alkyl radicals such as methyl, ethyl, propyl, butyl and hexyl and can also represent the phenyl radical. In addition, X can be a hydrogen atom, except when $p$ has a value of 2.

The aminosilanols (1) employed in the reaction can be prepared, for example, as described in co-pending U.S. applications Ser. No. 761,815 filed Sept. 23, 1968 and Ser. No. 761,814 filed Sept. 23, 1968. The silane reactants 2(a) and the silazanes 2(b) are known materials and methods for their preparation will be evident to those skilled in the art.

Reaction between the silanol or siloxanol (1) and the aminosilicon compound (2) is best carried out in the presence of an acidic catalyst. The presence of such a catalyst facilitates the reaction of the second amino group in the aminosilicon compound with the silanol or siloxanol and significantly reduces the overall reaction time. Examples of acidic catalysts which can be employed for this purpose are chlorosilanes, sulphuric acid, hydrochloric acid, acetic acid and acid salts of organic amines and ammonia, e.g., ammonium sulphate.

The reaction can also be further expedited by the application of heat. However, high temperatures are best avoided as their use may cause decomposition of one or both of the reactants. Generally, we prefer to carry out the preparative reaction at temperatures in the range from 20° to 60° C. The relative proportions of the reactants employed is not narrowly critical. Preferably, however, stoichiometric or approximately stoichiometric quantities of the reactants are used.

Inert solvents, for example, hydrocarbons such as toluene or xylene or oxygenated hydrocarbons such as diethyl ether and tetrahydrofuran can be included in the reaction mixture. In most cases, however, the reaction can be satisfactorily carried forward in the absence of such solvents. Recovery of the desired reaction product may be achieved by any suitable method, for example, by fractional distillation.

The compounds of this invention are useful as intermediates in the preparation of other organosilicon compounds and also as antifoaming agents.

The following examples illustrate the invention.

EXAMPLE 1

Bis(trimethylsilyl)aminodimethylsilanol $$[(CH_3Si)_2N(CH_3)_2SiOH]$$

(41.0 g., 2 mol) was added to bis(methylamino)dimethylsilane $[(CH_3NH)_2Si(CH_3)_2]$ (10.3 g., 1 mol) with stirring and a brisk evolution of methylamine was observed. Analysis, by vapor phase chromatography, of the reaction mixture indicated that reaction involving the first amino group in the bis(methylamino)dimethylsilane had taken place.

To the reaction mixture was then added dimethylchlorosilane (50 μl.) as catalyst and the mixture allowed to stand at room temperature for one week. After this time, the reaction mixture was distilled to yield 1,5-bis[bis(trimethylsilyl)amino] 1,1,3,3,5,5-hexamethyltrisiloxane (26 g., 57%) B.P. 138°/1 mm. Hg. (Found (percent): C, 41.3; H, 10.24; N, 5.2; Si, 36.2; $C_{18}H_{54}N_2O_2Si$ requires C, 41.0; H, 10.3; N, 5.3; Si, 37.3.)

EXAMPLE 2

1-bis(trimethylsilyl)amino-1,1,3,3-tetramethyldisiloxan-3-ol $[(CH_3Si)_2NSi(CH_3)_2OSi(CH_3)_2OH]$ (6.3 g., 8 mol) and octamethylcyclo tetrasilazane (0.7 g., 1 mol) were dissolved in benzene (5 ml.), dimethyldichlorosilane (2.5 μl.) added with stirring and the mixture maintained at 85° C. for 3 weeks, the progress of the reaction being followed by vapor phase chromatography.

Preparative vapor phase chromatography yielded 1,9-bis-[bis(trimethylsilyl)amino] - 1,1,3,3,5,5,7,7,9,9 - decamethylpentasiloxane. (Found (percent): C, 39.4; H, 9.88; Si, 35.5; N, 4.2.) $C_{22}H_{66}Si_9N_2O_4$ requires C, 39.2; H, 9.8; Si, 37.4; N, 4.15.

That which is claimed is:

1. Organosilicon compounds of the general formula $[(R_3Si)_2NSiR'_2(OSiR''_2)_nO]_2SiR'''_2$ wherein each R represents a hydrogen atom, an alkyl or alkenyl radical containing less than 6 carbon atoms or a monocyclic aryl radical, not more than two R groups attached to any silicon atom being hydrogen atoms, each R' and R''' represents an alkyl or alkenyl radical containing less than 6 carbon atoms or a monocyclic aryl radical, each R'' represents a monovalent hydrocarbon radical and $n$ has a value of 0 or 1.

2. Organosilicon compounds as described in claim 1 wherein R, R', R'' and R''' are each selected from methyl and ethyl radicals.

3. 1,5-bis [bis(trimethylsilyl)amino] 1,1,3,3,5,5-hexamethyltrisiloxane.

4. 1,9-bis [bis(trimethylsilyl)amino] 1,1,3,3,5,5,7,7,9,9-decamethylpentasiloxane.

5. A process for the preparation of organosilicon compounds of the general formula

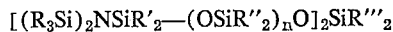

which comprises reacting (1) a compound of the general formula $(R_3Si)_2NSiR'_2[OSiR''_2]_nOH$ with (2) an aminosilicon compound of the general formula (a)

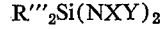

or (b) $(R'''_2SiNX)_p$, wherein each R represents a hydrogen atom, an alkyl or alkenyl radical containing less than 6 carbon atoms or a monocyclic aryl radical, not more than two R groups attached to any one silicon atom being hydrogen atoms, each R' and R''' represents an alkyl or alkenyl radical containing less than 6 carbon atoms or a monocyclic aryl radical, each R'' represents a monovalent hydrocarbon radical and $n$ has a value of 0 or 1, X is hydrogen, an alkyl radical or the phenyl radical, Y is an alkyl radical or the phenyl radical and $p$ has a value of 2, 3 or 4, X being an alkyl or a phenyl radical when $p$ is 2.

6. A process as claimed in claim 5 wherein the reaction is carried out in the presence of an acidic catalyst.

References Cited

UNITED STATES PATENTS 3,253,008  5/1966  Fink _____ 260—448.2(N)

JAMES E. POER, Primary Examiner

P. F. SHAVER, Assistant Examiner

U.S. Cl. X.R.

252—357; 260—46.5, 448.2E, 448.2H